(No Model.) 8 Sheets—Sheet 1.

G. TEIDEMAN.
LIQUID METER.

No. 390,918. Patented Oct. 9, 1888.

Fig. 1.

Witnesses,
Baltus J. Long.
N. H. Smith

Inventor.
George Teideman.
By his attys,
Baldwin, Davidson & Wight (No Model.) 8 Sheets—Sheet 3.

G. TEIDEMAN.
LIQUID METER.

No. 390,918. Patented Oct. 9, 1888.

Witnesses:
Baltus De Long.
A. H. Smith.

Inventor:
George Teideman,
By his Atty's.
Baldwin, Davidson & Wight.

(No Model.) 8 Sheets—Sheet 6.

G. TEIDEMAN.
LIQUID METER.

No. 390,918. Patented Oct. 9, 1888.

United States Patent Office.

GEORGE TEIDEMAN, OF BOROUGH ROAD, COUNTY OF SURREY, ENGLAND.

LIQUID-METER.

SPECIFICATION forming part of Letters Patent No. 390,918, dated October 9, 1888.

Application filed September 3, 1888. Serial No. 284,416. (No model.) Patented in England April 4, 1887, No. 5,013; in France January 28, 1888, No. 188,406, and in Belgium January 30, 1888, No. 80,453.

*To all whom it may concern:*

Be it known that I, GEORGE TEIDEMAN, a subject of the Queen of Great Britain, residing at 27 Lancaster Street, Borough Road, in the county of Surrey, England, have invented certain new and useful Improvements in Liquid-Meters, (for which I have received Letters Patent in Great Britain, No. 5,013, dated April 4, 1887; in France, No. 188,406, dated January 28, 1888, and in Belgium, No. 80,453, dated January 30, 1888,) of which the following is a specification.

My invention relates to that class of liquid-meter in which there are two chambers, in each of which works a piston or diaphragm, and into which the liquid is passed in and out by valves, the movements of the valve of one chamber being controlled by the movement of a rod passing from the piston or diaphragm of the other chamber.

One chamber I form, as heretofore, of larger dimensions than the other, the smaller chamber being used for the purpose of shifting the valve of the larger chamber. The two chambers I place preferably at right angles to one another, the larger chamber being placed vertically and the smaller chamber horizontally above it. The piston or diaphragm rod passing out from the top of the larger chamber I cause to act alternately on the two arms of a rocking lever, which are somewhat inclined the one to the other. This lever I couple by a link to a slide-valve which controls the passage of liquid to and from the smaller chamber. As the rod makes its outward stroke it rocks the lever above mentioned and causes it to shift the slide-valve of the smaller chamber, so as to admit liquid to the rear end of this chamber. The pressure of liquid on the back of the diaphragm or piston in the chamber then tends to force the diaphragm or piston rod outward; but it is restrained from doing so by a locking arrangement which holds it back until the piston or diaphragm of the larger chamber has made its full stroke. One way in which this may be effected is as follows: The rod of the piston or diaphragm of the smaller chamber has a bar fixed to it at right angles. This bar comes against another bar fixed to the rod of the piston or diaphragm of the larger chamber parallel with it; but when by the movement of this rod the bar upon it is carried past the bar on the rod of the smaller chamber the rod of the smaller chamber is free to be forced outward by the pressure of the liquid, and then at once and quickly the valve of the larger chamber is moved, so as to cause the diaphragm or piston working in it to be driven in the opposite direction to that in which it was before moving. As the rod of the larger chamber moves back it again shifts the rocking lever, so shifting the valve of the smaller chamber and admitting fluid to the front end of this chamber to press upon its piston or diaphragm in a direction to again reverse the position of the valve of the larger chamber; but it is prevented from doing so by the bar which is affixed to its rod again bearing against the bar carried by the rod of the larger chamber, but on the opposite side of it, so that the valve of the larger chamber cannot be shifted until its rod has again completed its stroke. In this way great accuracy of measurement is insured.

The valves I use are preferably slide-valves of the ordinary kind working horizontally. The exhaust-ports from the two chambers I lead to one common outlet, and the supply-ports are alternately opened to the interior of the meter-casing, which is kept supplied with liquid through a liquid-supply pipe. The movements of the piston or diaphragm rods are recorded by suitable recording mechanism.

In order that my said invention may be more fully understood and readily carried into effect, I will describe the drawings hereunto annexed.

In the drawings, Fig. 1× is a similar section to Fig. 1, the parts being shown in the position they assume when the diaphragms are at the extreme of the outstroke.

In all these figures like letters of reference refer to like parts.

The large chamber is made in two pieces, A A', bolted together, with a diaphragm, B, between them. A cover, A², bolted onto the piece A', forms a chamber or reservoir for the water-supply. It also contains the valve mechanism. The diaphragm B is clamped to a piston-rod, C, by two plates, B' B', the piston-rod C working through a stuffing-box, C$^\times$. On the other end of the piston-rod C is a bar or stop, C', and projections C² C³.

The small chamber is made in two parts, D D', bolted together, with a diaphragm, E, between them. This diaphragm is clamped to a piston-rod, F, by two plates, E' E'. The piston-rod F works through a stuffing-box, F$^\times$, and outside the stuffing-box carries a stop, F'. Water is supplied to the upper chamber or reservoir through the inlet-pipe I. It passes up through the grating I' into the interior of the casing. The large chamber has supply-ports $a$ $a'$ leading into it, one on either side of the diaphragm, and a discharge-port, $a^2$. The ports $a$ $a'$ are alternately covered by a valve, G. The small chamber has supply-ports $d$ $d'$ leading into it, one on either side of the diaphragm, and a discharge-port, $d^2$. The ports $d$ $d'$ are alternately covered by a valve, H.

Figure 1:
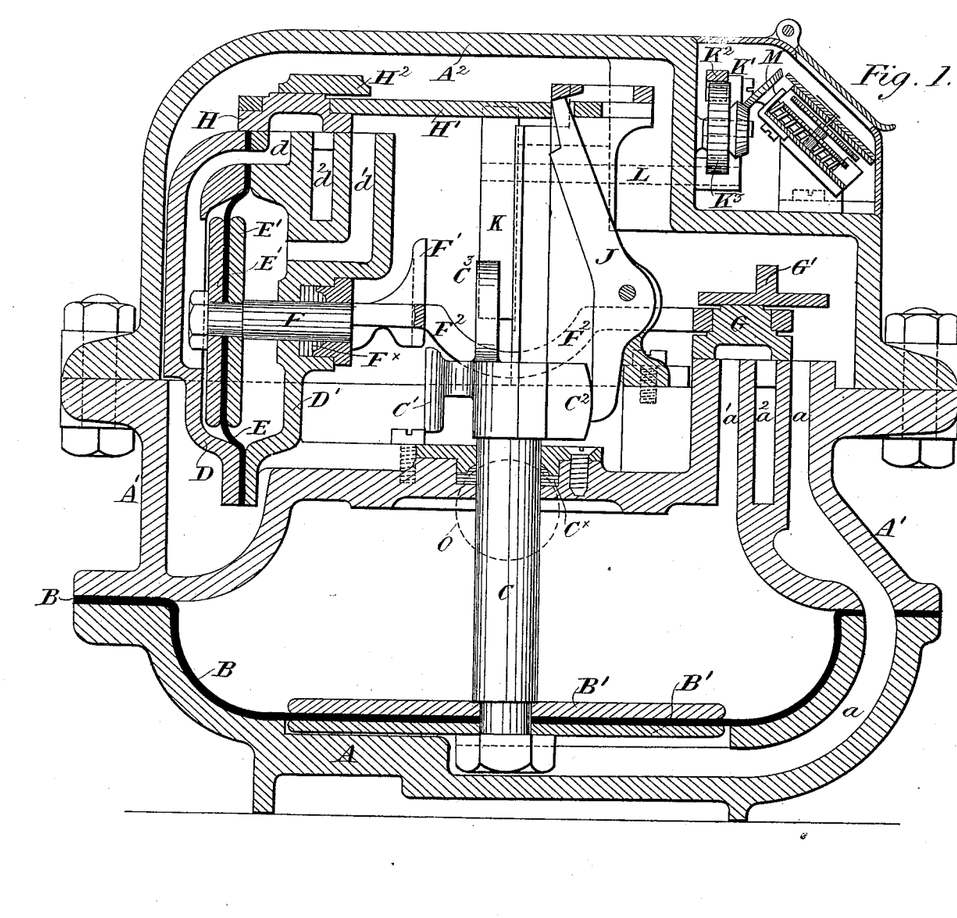
Figure 1 is a vertical section of a meter fitted with two diaphragm-pistons, the line of section being the center line of the piston-rods, the piston-rods being shown in full.
Figure 2:
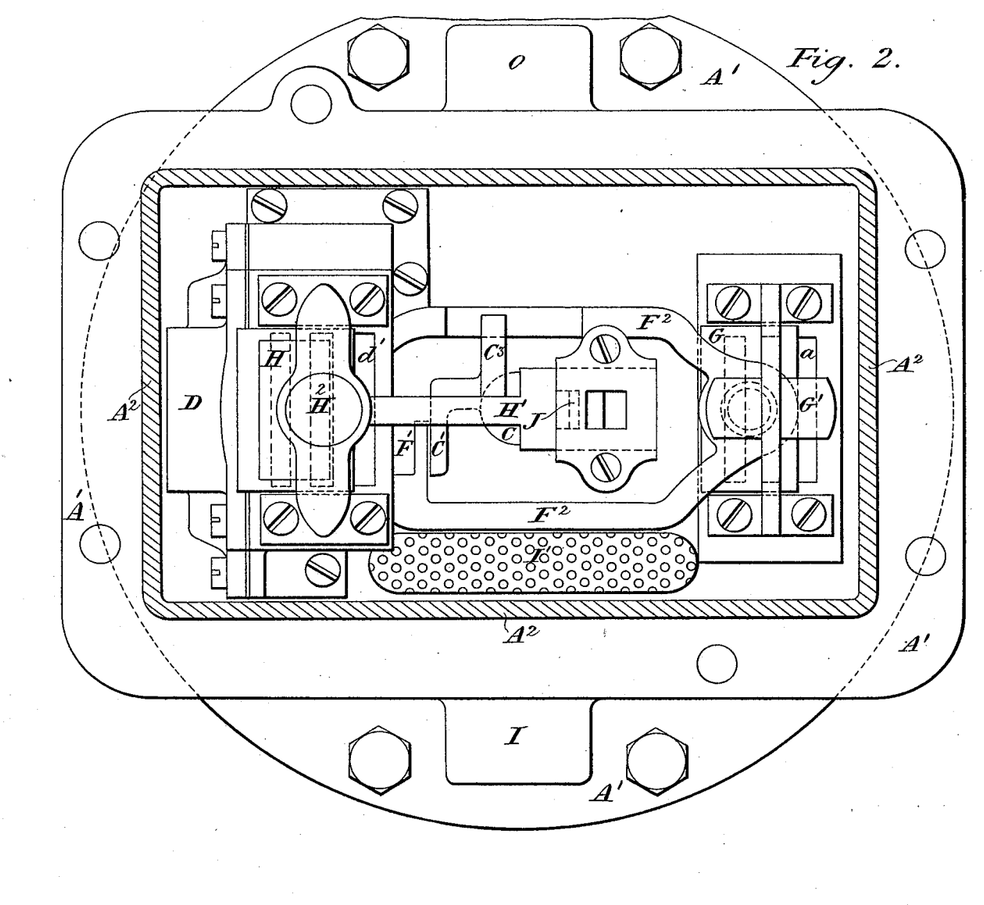
Fig. 2 is a plan of the same with the top portion of the cover cut away.
Figure 3:
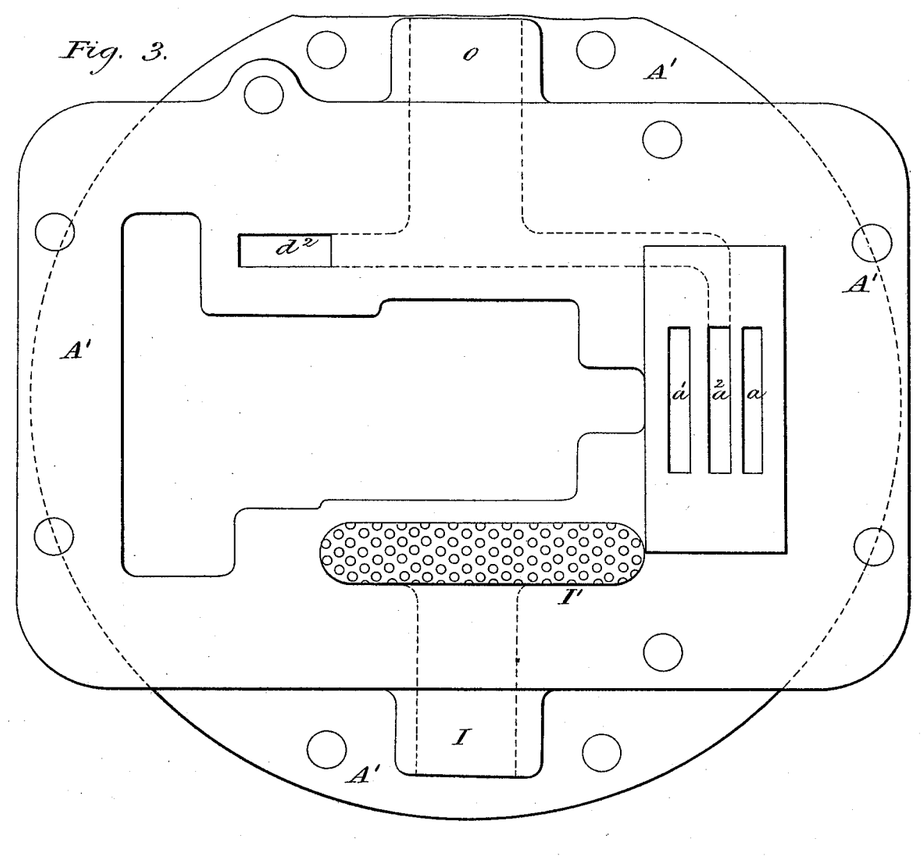
Fig. 3 is a plan of the center casting of the shell, showing the inlet and outlet orifices and the passages leading thereto.

The valve G is moved by the piston-rod F by the link F² being kept on its seat by the bar G', and the valve H is moved by the rocking lever J acting on the link H'. This valve is kept on its seat by the bar H². The position in which the parts are shown in Fig. 1 is when both pistons have just completed their outward stroke and the valve G has uncovered the port $a$ to the reservoir and closed $a'$ from the reservoir, but opened it to the outlet O by the port $a^2$. Water can now pass to the under side of the piston or diaphragm B, which immediately commences to rise. This movement causes the bar or stop C' to pass up in front of the bar F' on the piston-rod F, which is thus locked. Further movement of the piston B causes the projection C² to come against the face of the top end of the rocking lever J, the end of which toward the last part of its movement comes against the inner end of a slot formed in the link H'. This now moves the valve H, closing the port $d'$ from the reservoir, but opening it to the outlet O by the port $d^2$, and, uncovering the port $d$, admits water behind the small piston or diaphragm E, forcing it outward. It, however, cannot move until the bar or stop C' has moved clear of the bar or stop F'. So soon as they are clear the small piston moves the valve H, which closes the port $a$ from the reservoir, opening it to the discharge-port $a^2$. It also uncovers the port $a'$, admitting water to the top of the diaphragm or piston B. This at once commences to move downward. The bar or stop C', coming behind the bar or stop F', again locks the small piston. Further movement of the piston causes the projection C² to come against the face of the bottom end of the rocking lever J, the end of which toward the last part of its movement again uncovers the port $d'$, and thus an intermittent to-and-fro motion is given to the pistons, the small one being always locked by the large piston until the latter has completed its stroke.

It will be seen that at each stroke up and down of the diaphragm both the large and small chambers discharge a quantity of water equal to the capacity of both chambers into the outlet-passage O.

Figure 4:
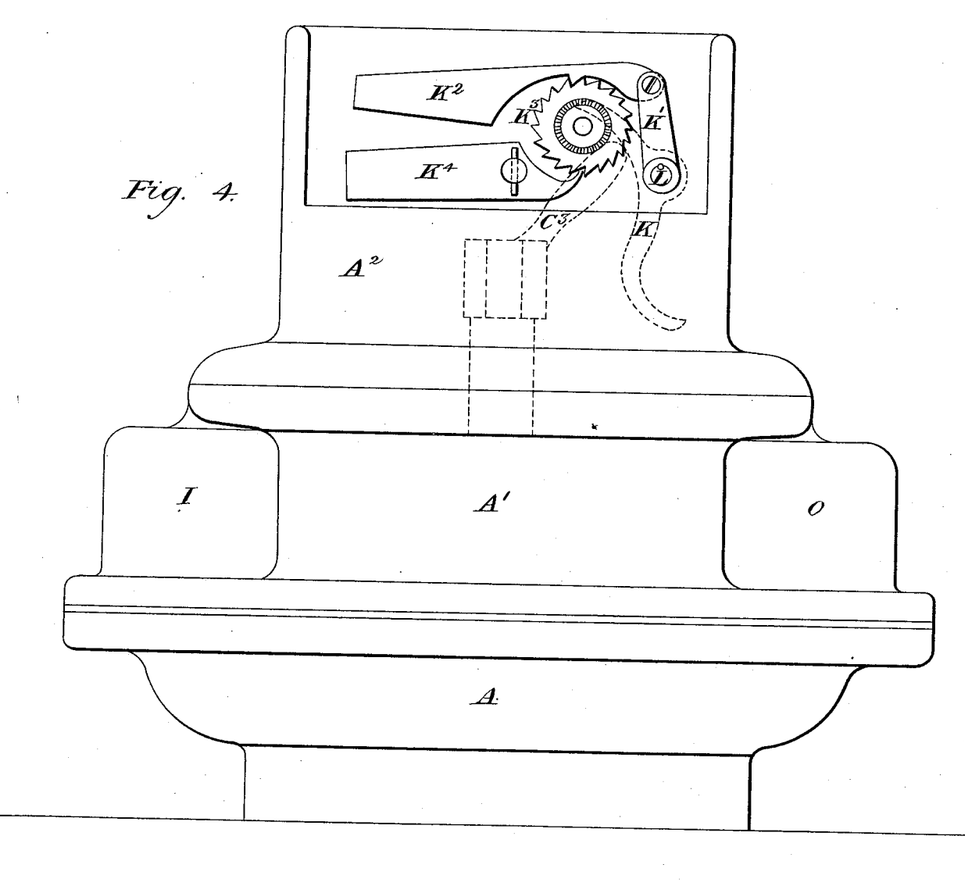
Fig. 4 is a front elevation of the meter with the counter removed to show the ratchet-gear by which the counter receives its motion.
Figure 5:
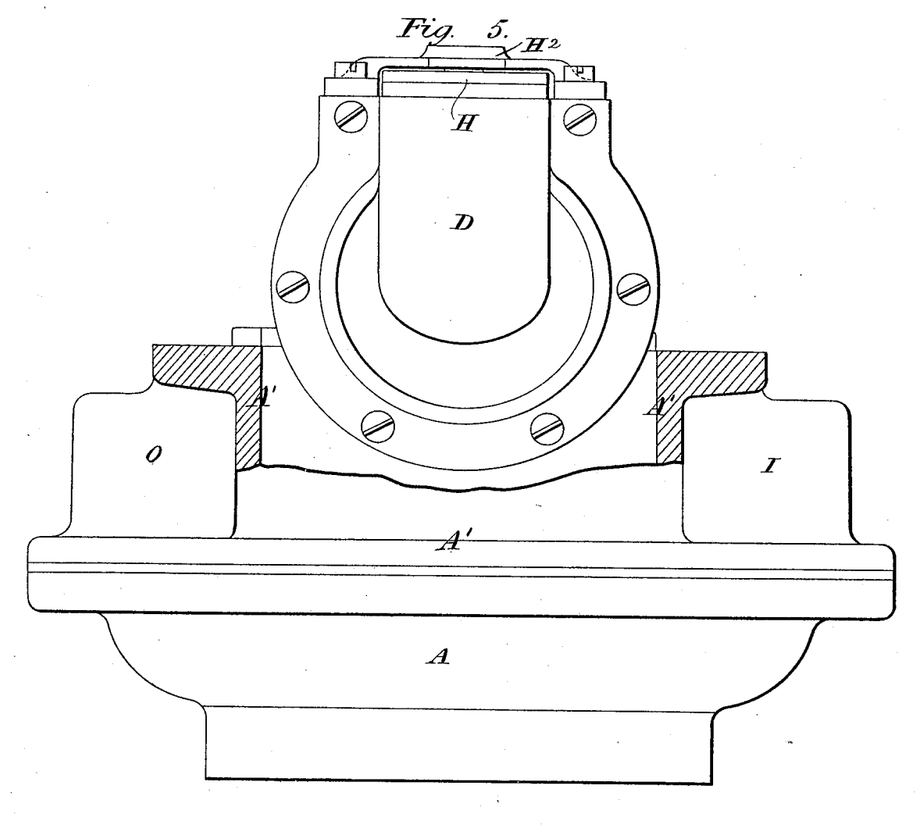
Fig. 5 is the back elevation of the meter with the cover removed and a portion of the shell of the large chamber cut away to show the back of the small chamber and its valve.
Figure 6:
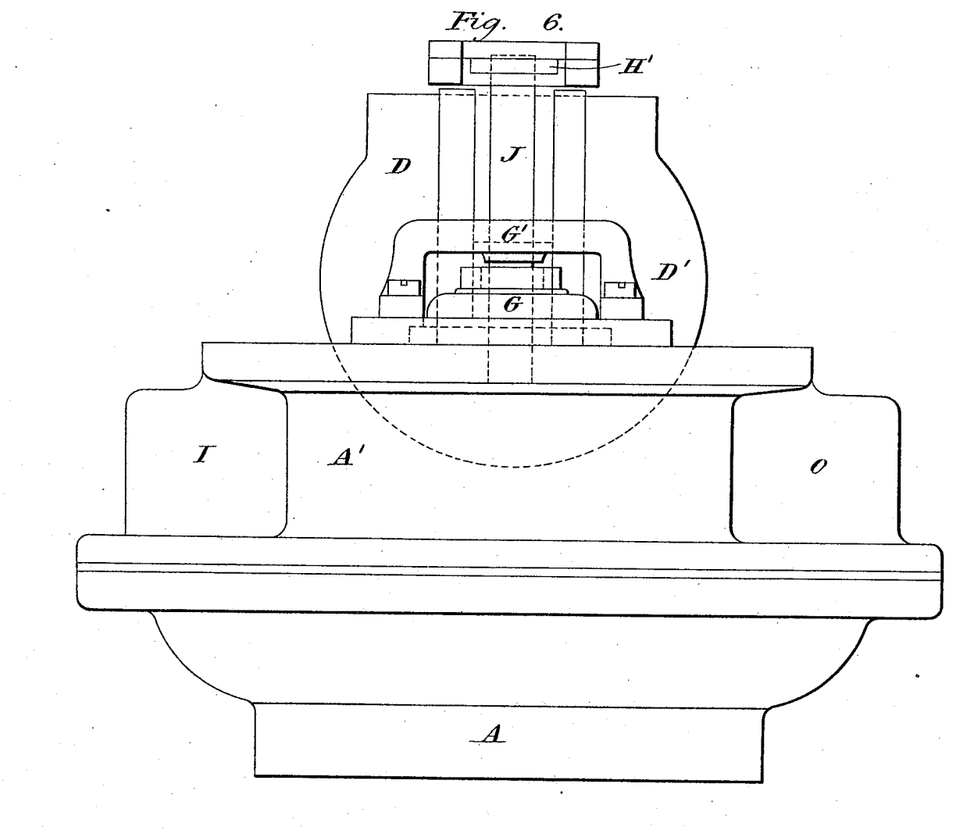
Fig. 6 is the front elevation of the meter with the cover removed to show the rocking lever which actuates the valve and regulates the flow of water to the small piston. It also shows the valve which regulates the flow of water to the large piston.

In order that the number of strokes may be registered and in this way the quantity of water delivered recorded, the projection C³ on the piston-rod C comes against first one end and then the other end of a lever, K, keyed on a spindle, L, which works in a stuffing-box in the upper portion of the reservoir-case. (See Figs. 1 and 4.) On the outer end of this spindle is another lever, K', to which is attached a weighted ratchet-pawl, K², working into the teeth of the ratchet-wheel K³ and imparting motion to it. A stationary pawl, K⁴, prevents backward movement of the wheel. The ratchet-wheel K³ has a bevel-wheel attached to it, and this gives motion to a pinion, M, (see Fig. 1,) fixed to a worm which gears into a worm-wheel, giving motion to an ordinary meter-recording mechanism having a dial-face and pointers.

Figure 7:
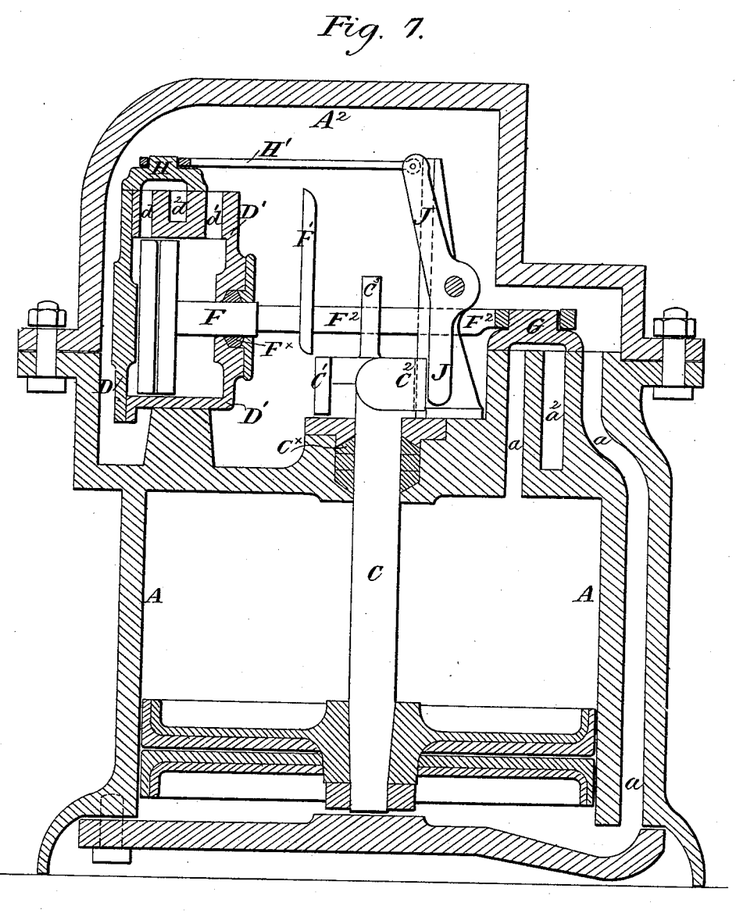
Fig. 7 is a similar section to Fig. 1 and shows a modified form of meter.

In Fig. 7 I have shown a modified form of meter. In this meter, in place of diaphragms, I employ pistons with double cup-leathers.

The movement of the parts and the mode of locking the small piston-rod is identical with that of the other meter, the form of the parts being slightly altered to suit the modified form.

In some cases I prefer to use cup-leathers for the large piston and a diaphragm for the small, and in others cup-leathers for the small piston and a diaphragm for the large.

It will be understood that I do not confine myself to the locking arrangements which I have above described, as it is obvious that other methods of locking can be applied.

Having now particularly described and ascertained the nature of my said invention and in what manner the same is to be performed, I declare that what I claim is—

1. In a liquid-meter, the combination, substantially as described, consisting of a main measuring-chamber with a piston or diaphragm working within it, an auxiliary or smaller chamber, also with a piston or diaphragm, valves in connection with these chambers controlling the passage of liquid into and from the chambers, valve-gear connecting the piston or diaphragm of one chamber with the valve of the other chamber, and locking apparatus restraining the piston or diaphragm of the auxiliary or smaller chamber, so that it can only commence to move when the piston or diaphragm of the main chamber is at one end or other of its stroke.

2. In a liquid-meter, the combination, substantially as described, consisting of the main measuring-chamber A, with its piston or diaphragm, the auxiliary chamber D, with its piston or diaphragm, the valves G and H and the gear actuating the same, the locking projection C' on the head of the rod of the main piston or diaphragm, and the corresponding projection, F, on the head of the rod of the auxiliary piston or diaphragm.

GEORGE TEIDEMAN.

Witnesses:
HERBERT E. DALE,
JNO. DEAN,
*Both of 17 Gracechurch Street, London, E. C.*